United States Patent [19]

Persson

[11] Patent Number: 5,219,107
[45] Date of Patent: Jun. 15, 1993

[54] METHOD FOR PRODUCING A GLASS KNIFE

[75] Inventor: Algy Persson, Stockholm, Sweden

[73] Assignee: Glass Ultra Micro Trading Company, Stockholm, Sweden

[21] Appl. No.: 781,194

[22] PCT Filed: Apr. 19, 1990

[86] PCT No.: PCT/SE90/00263

§ 371 Date: Dec. 6, 1991

§ 102(e) Date: Dec. 6, 1991

[87] PCT Pub. No.: WO90/12763

PCT Pub. Date: Nov. 1, 1990

[30] Foreign Application Priority Data

Apr. 20, 1989 [SE] Sweden ................. 8901438

[51] Int. Cl.$^5$ ............................................. C03B 33/023
[52] U.S. Cl. ...................................... 225/2; 225/93.5; 225/103
[58] Field of Search ............... 225/2, 1, 96.5, 105, 225/103, 104

[56] References Cited

U.S. PATENT DOCUMENTS

| | | |
|---|---|---|
| 3,207,398 | 9/1965 | Bo Gosta Forsström et al. |
| 3,494,521 | 2/1970 | Hellström. |
| 3,819,096 | 6/1974 | Pyper ........................... 225/96.5 |
| 3,908,878 | 9/1975 | Blum ........................... 225/96.5 |
| 4,175,684 | 11/1979 | Butler ........................... 225/2 |
| 4,231,503 | 11/1980 | Butler ........................... 225/2 |
| 4,256,246 | 3/1981 | Kindel ........................ 225/96.5 X |
| 4,317,401 | 3/1982 | Disharoon ..................... 225/2 X |

FOREIGN PATENT DOCUMENTS 310768 7/1968 Sweden.
354915 7/1968 Sweden.

Primary Examiner—Douglas D. Watts
Assistant Examiner—Rinaldi Rada
Attorney, Agent, or Firm—Christie, Parker & Hale

[57] ABSTRACT

A method for producing a glass knife, in which a flat glass plate (511) is divided by breaking along a divising line (23) scratched on said plate. The plate is placed on two lower supporting pins (9, 10), positioned by the use of means (7, 8) cooperating with the side edge surfaces of the glass plate, and is fixed by means of two upper supporting pins (17, 18) which are made to engage the upper face of said plate. Each pair of supporting pins has a line of symmetry perpendicular to the line of symmetry of the other pair, one line of symmetry coinciding with the dividing plane. Before the glass plate is broken by moving the supporting pins towards one another, the positioning means (7,8) are, at least partially, disengaged from the glass plate, such that essentially only the forces deriving from the supporting pins act upon the glass plate during the breaking thereof.

11 Claims, 3 Drawing Sheets

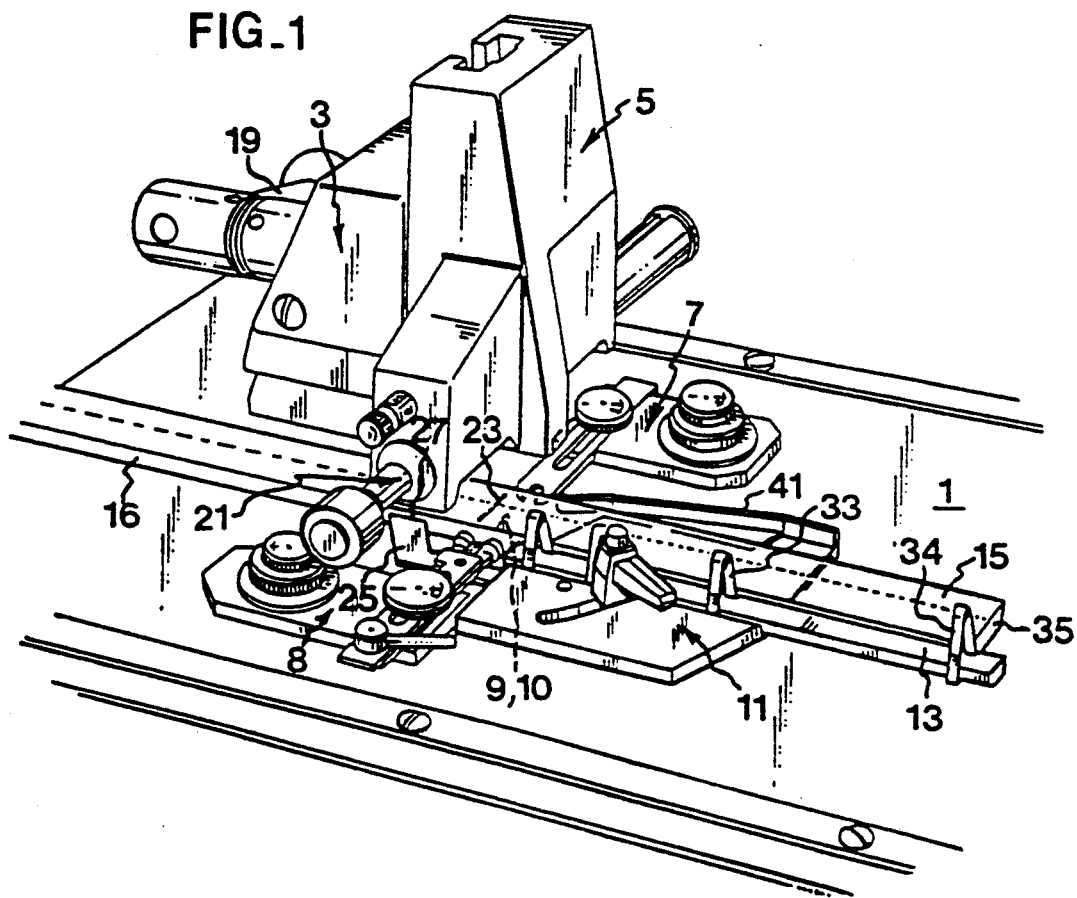
FIG._1
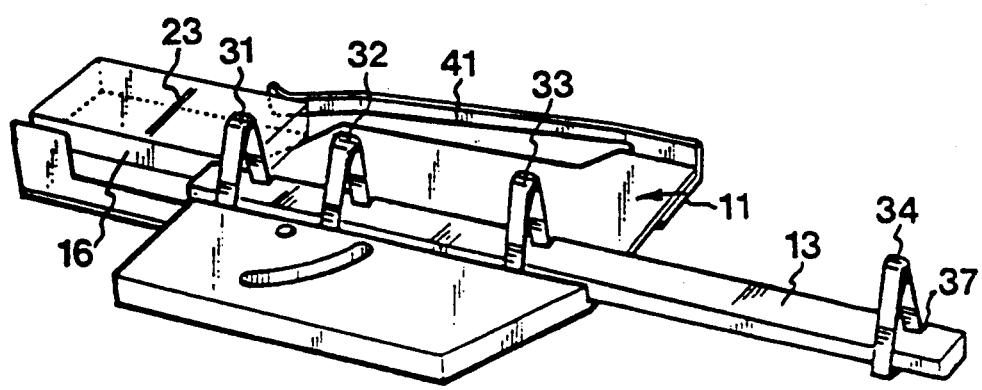
FIG._2

FIG._3
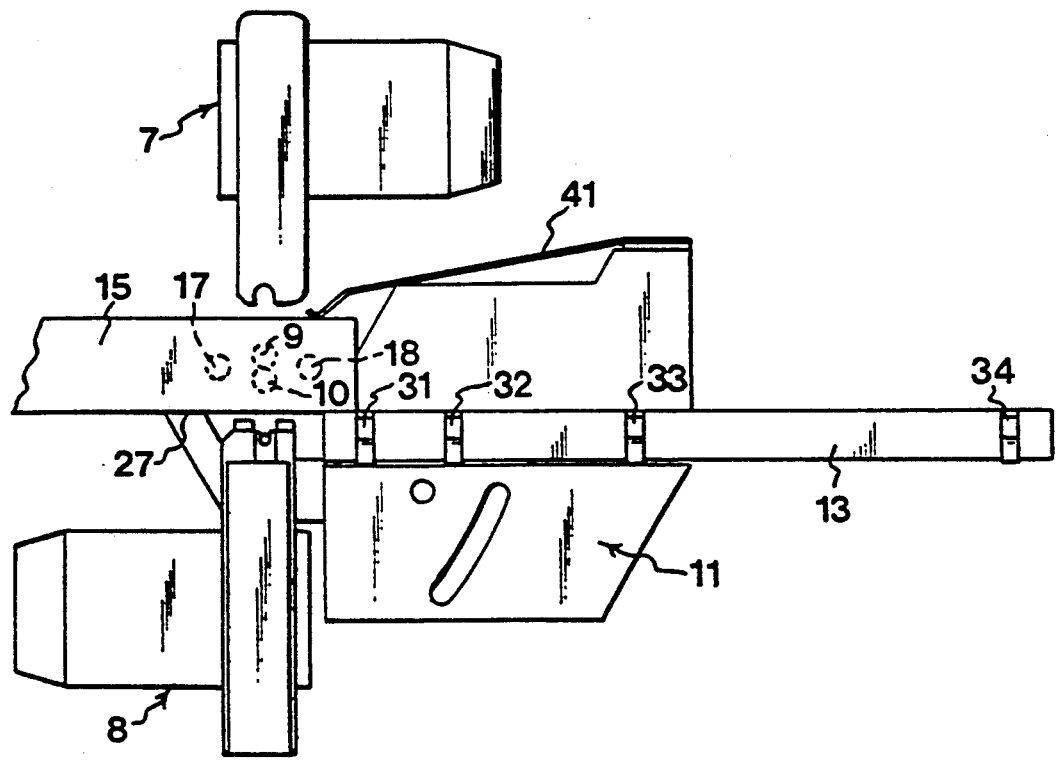
FIG._7
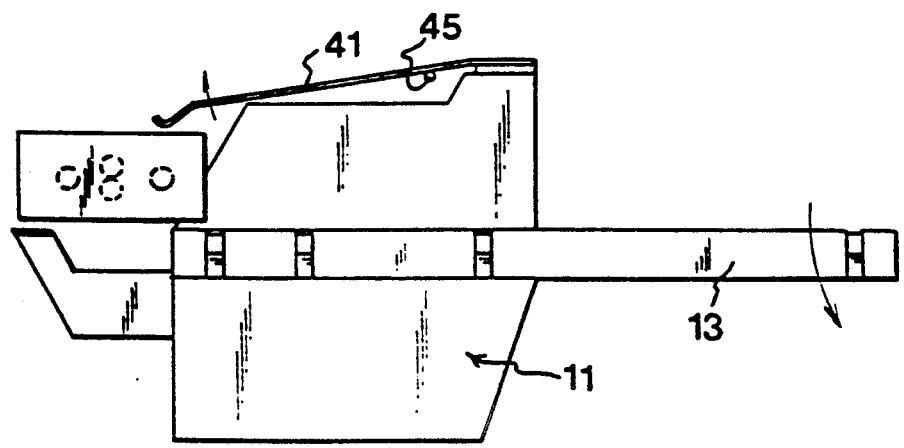

METHOD FOR PRODUCING A GLASS KNIFE

FIELD OF THE INVENTION

The present invention relates to a method for producing a glass knife, especially for use in microtomy and ultramicrotomy, includes a step such that a flat glass plate is divided by breaking along a dividing line scratched thereon.

BACKGROUND OF THE INVENTION

It is prior art technique to produce glass knives from a plate of flat glass which is placed with one plane surface on first supporting means providing at least two separate points of support symmetrically arranged in relation to the desired dividing line. The glass plate is placed in a predetermined dividing position by positioning means cooperating with the side edge surfaces of the plate. The positioned glass plate is fixed by fixing means being pressed against the plate which is then provided with the scratch forming the dividing line. Two further supporting means, which also are symmetrically arranged in relation to the desired dividing line and which have a line of symmetry perpendicular to the line of symmetry of the first supporting means, are applied against the second plane surface of the glass plate. Preferably, the second supporting means also constitute the said fixing means. One of the above-mentioned lines of symmetry is located in the desired dividing plane on the unscratched face of the glass plate. In a preferred embodiment, the last-mentioned line of symmetry is established by the first supporting means which usually comprise two separate, rounded supporting pins whose center points are located on said line of symmetry but which may also consist of an elongate edge or the like, as readily understood. Finally, the glass plate is broken by moving the first and second supporting means towards one another in a direction perpendicular to the plane of the glass plate, usually by moving the two second supporting means downwards towards the first supporting means until the glass plate is broken along the dividing line.

When producing glass knives, it is customary to start with a straight glass strip with plane-parallel longitudinal side edges and end side edges, which is divided into smaller square or rhombic glass plates of predetermined size. Positioning is achieved by causing one end edge surface of the glass strip to engage with an abutment pin, and by causing one longitudinal edge surface of the strip to engage with an abutment rail. The abutment pin and the abutment rail are situated each on one side of the dividing line. The position of the plate is maintained during the scratching and breaking operations.

The resulting smaller glass plates are then broken, substantially along a diagonal line, to produce triangular glass knives, the glass plate being positioned by causing the side edge surfaces at each of the two opposite corners between which the dividing line is to run, to engage with adjustable, fork-like means for positioning said corners. The engagement between these means and the glass plate is maintained during the scratching and breaking of the plate.

Swedish Patent SE 310,768 and U.S. Pat. Nos. 3,207,398 and 3,494,521 disclose examples of the above prior art technique. Apparatuses using this technique have long been manufactured and sold by LKB-Produkter AB, Bromma, Sweden under the name of KNIFEMAKER.

Although this known technique has functioned well and resulted in high-quality glass knives, a considerable number of the thus obtained plates and knives have not been up to standard and have had to be scrapped.

OBJECT OF THE INVENTION

The object of the present invention is to achieve an improvement of the method stated in the introduction, so that, on the one hand, a higher quality is obtained and, on the other hand, reproducibility is increased, i.e., that the number of glass plates and knives which have to be discarded is reduced, without the method becoming more complicated or expensive.

SUMMARY OF THE INVENTION

This object is achieved in that the method according to the invention has the distinctive features stated in the appended claims.

Thus, the invention is based on the surprising discovery that it is possible, despite very high demands on the dimensional accuracy of the intermediate product plates and the end product knives, to carry out the breaking without maintaining the precise plate position afforded by the positioning means. According to the invention, the positioning means are, before the breaking of the glass plate, at least partially disengaged from the plate, so that essentially only the forces deriving from the first and second supporting means act upon the plate during the actual breaking operation. Preferably, the engagement of the positioning means is completely eliminated before the breaking.

It has been found that eliminating the engagement of the positioning means according to the invention involves removing a complex of uncontrolled forces acting upon the glass plate and deriving from the positioning means employed. In this manner, the dividing breaks become more exact and more easily reproducible.

The disengagement of the positioning means can be performed in different ways for the end product breaking and the intermediate product breaking step, respectively.

In the end product breaking step, i.e., the breaking of a square or rhombic glass plate into triangular glass knives, a complete elimination of the engagement of the positioning means may advantageously be brought about in that the adjustable means conventionally employed for positioning the corners are, before the breaking, retracted in a predetermined determined way from the predetermined engagement position and, after the breaking, the removal of the resulting pieces of glass plate and the insertion of a new, identical glass plate to be broken, are returned to the engagement position for placing the new glass plate in the predetermined dividing position. Thus, known conventional corner positioning means only have to be modified in order to be compatible with this controlled back and forth motion. The modification is technically uncomplicated and can easily be achieved by anyone skilled in the art. In actual practice, it has been found that this use of the invention renders it possible to have the scratch nearer to the exact diagonal line desired for the cut than has previously been possible, while maintaining a sufficient certainty that the knife edge will form on the desired side of the corner edge of the glass plate. Thus, the knife edge will be nearer to the corner edge than before, have an edge angle closer to the desired one (i.e. half the corner angle), and generally present improved edge properties.

In the intermediate product breaking step, i.e., breaking of a glass strip, it has proved to be especially advantageous to eliminate, before the breaking, the engagement between the end edge surface of the glass strip and the positioning means therefor. As to the engagement with the longitudinal edge surface of the strip, it has been found to be advantageous if this occurs at two separate points, one on each side of the intended dividing line. Most preferably, the engagement with the longitudinal edge surface is also completely eliminated before the breaking, suitably in a fashion similar to the one stated above for the corner positioning means in connection with the end product breaking, the abutment means employed for the cooperation with the longitudinal edge surface of the glass strip being optionally arranged on or forming part of a rail or the like which is easily pivotable or laterally movable to provide the desired effect.

It has, however, been found that the cooperation with the longitudinal edge surface of the glass strip may remain, at least to a reduced extent, and still provide satisfactory inventive effect, if the cooperation is brought about by abutment means with rounded cooperation surfaces having a substantial line contact and low adhesion, resulting in low forces between the longitudinal edge and cooperation surfaces of the abutment means.

Usually, the intermediate product breaking step is carried out according to either one of two preferred methods. According to the first method, smaller and preferably square glass plates are successively separated from one end side of the glass strip in order to be further broken and made into triangular glass knives, the positioning means being made to cooperate with the end edge surface of the end side and with a longitudinal edge surface of the strip, as mentioned before According to the invention, the positioning cooperation with the longitudinal edge surface occurs on both sides of the intended dividing line, as indicated, the end edge surface of the strip for positioning engaging with an abutment means chosen to suit the length of the divided glass plate which preferably manually, is placed and maintained in an engaged position from which it is retracted, preferably resiliently, before the breaking step.

According to a second preferred method, the glass strip is divided in the middle to form shorter strips intended to be further divided in the middle and to form smaller, preferably square glass plates to be further divided and made into the end product in question, i.e., triangular glass knives. The positioning means is made to cooperate with an end edge surface at a point chosen according to the length of the strip and with a longitudinal edge surface of the strip. According to the invention, the end edge surface of the glass strip is made to cooperate for positioning with a chosen abutment means which, preferably manually, is placed and maintained in cooperation position from which it is retracted, preferably resiliently, before the breaking step.

In both methods, there is also cooperation with the longitudinal edge surface of the glass strip, as indicated above.

According to the invention, it is especially preferred that at least the cooperation with the end edge surface of the glass strip be eliminated after the second supporting means have initially engaged the glass strip so as to maintain the position thereof.

It has been found that the division according to the invention of a glass strip into shorter strips or plates results in improved dividing surfaces and higher dimensional accuracy. Naturally, this has a favorable effect on the subsequent diagonal division for producing knives, in that the glass plates employed are particularly dimensionally accurate and, consequently, can be positioned in a more exact way.

The invention will be further illustrated by means of exemplifying embodiments described hereinafter, reference being had to the accompanying drawings.

BRIEF DESCRIPTION OF THE DRAWINGS

FIG. 1 is a schematic perspective view of the upper part of a basically conventional apparatus for dividing glass plates, the apparatus being modified so as to be capable of dividing glass plates in the form of strips, in accordance with the invention.

FIG. 2 is a schematic and enlarged perspective view of a modified part of the apparatus in FIG. 1.

FIG. 3 is a schematic top plan view further illustrating the positioning of a glass strip in the apparatus in FIGS. 1 and 2.

FIG. 7 is a further simplified partial top plan view similar to FIG. 3 and illustrating how the cooperation with the longitudinal edge surface of the glass strip can be completely eliminated before the breaking step

DESCRIPTION OF EMBODIMENTS

Figure 6:
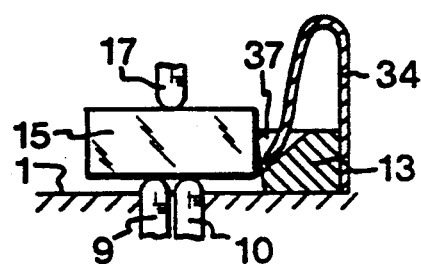
FIGS. 4–6 are schematic and part-sectional partial side views further illustrating the positioning and holding of the glass strip between the supporting means forming part of the apparatus.
Figure 5:
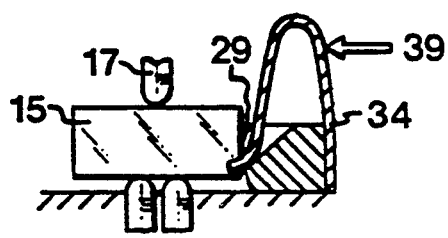

FIG. 1 shows schematically the upper part of an apparatus for breaking glass strips (intermediate product breaking), as well as square or rhombic glass plates (end product breaking). The basic construction of the apparatus is entirely conventional in that it comprises a top or base plate 1; a mounting 3 fixedly arranged on the top plate and supporting a vertically movable clamping and scratching head 5; a pair of adjustable corner positioning means 7, 8 for glass plates to be broken along a diagonal (see also FIG. 8); a pair of first supporting means in the form of supporting pins 9, 10 rounded at the top (see also FIGS. 4–6) separately projecting perpendicularly from the top plate 1 between the positioning means 7, 8, for supporting a glass strip or glass plate to be divided by breaking; and a guide plate 11 with a positioning guide rail 13 for a glass strip 15 to be divided into smaller glass plates for end product breaking. The guide plate 11 is disposed, in conventional fashion, on one side of the intended dividing line and adapted to be locked in different angular positions on the top plate 1, such that the glass strip 15 can be broken along a dividing line forming a desired angle (usually 90°) with the longitudinal direction of the strip. The guide plate 11 and its guide rail 13, which are further illustrated in FIGS. 2 and 3, have been modified to suit the invention, and these modifications will be discussed in more detail below.

On the underside, the head 5 has downwardly projecting, second supporting means (not shown in FIG. 1) in the form of two separate, rounded supporting pins which, together with the first supporting pins 9, 10, form a symmetrical and balanced supporting configuration formed like a cross and comprising four points of support, as is apparent from FIGS. 4-6 and 7-8. In these Figures, the two second supporting pins (or their points of engagement) are designated 17, 18. The downward movement of the head 5 to the clamping position is controlled by means of a lever 19. As shown in FIG. 1, a conventional scratching unit 21 is disposed on the front side of the head so as to provide a glass strip or glass plate clamped between the first and second supporting pins 9, 10, 17, 18 with a scratch line 23 coinciding with the line of symmetry defined by the points of support of the first supporting pins 9, 10. The points of support of the second supporting pins 17, 18 define a second line of symmetry perpendicular to the first line of symmetry.

The conventional manner of using this type of apparatus for breaking a glass strip is that the strip is placed on the first supporting pins 9, 10 and positioned by means of the guide rail 13 and a suitable end edge abutment means which, in prior art techniques, consists of an upwardly projecting abutment pin mounted in the top plate 1 to the left of the guide rail 13 and the head 5 (as seen in FIG. 1). Then, the head 5 is moved vertically down by means of the lever 19, such that the upper supporting pins 17, 18 engage with the upper surface of the glass strip and clamp it in the desired position, in which the strip otherwise is free from the top plate 1 and the guide plate 11. While maintaining cooperation between the clamped glass strip and the positioning means employed, the lower supporting pins 9, 10 are raised (by means not shown) until the strip is broken along the scratch line 23.

In the present invention, modifications have been made to ensure that the glass strip is not unfavorably affected by forces from the positioning means during the breaking step. Thus, firstly there is no abutment pin for the left end edge surface of the glass strip (as seen in FIG. 1); instead, special abutment means for the opposite end edge surface of the glass strip 15 are adjacent to the guide rail 13, as will be described in more detail below.

Furthermore, the guide rail 13 comprises two important modifications. Firstly, it has a base extension 25 to the left beyond the dividing line, which has, at its free end, an upwardly projecting abutment member 27 with a short longitudinal abutment surface parallel to and of the same type as that of the guide rail 13. In other words, the guide rail comprises two parts in that it has abutment or cooperation surfaces for positioning on both sides of the intended dividing line, resulting in a much improved positioning effect for the longitudinal edge, especially when the glass strip at issue is short, as illustrated in FIG. 2. Such a short glass strip is divided into two smaller plates which are to be divided along a diagonal line to produce triangular glass knives (cf. also FIG. 8).

Secondly, the cooperation surfaces 29 of the guide rail 13 are, on the long main member as well as on the abutment member 27, made convex to provide an essentially linear contact with the flat and straight longitudinal edge surface 16 of the glass strip 15. Furthermore, the material of the guide rail should be chosen to give low adhesion, a suitable material being aluminium whose oxidized surface layer gives such a low adhesion. The convex shape of the cooperation surfaces can be seen in the schematic FIGS. 4-6 which are cross-sections (i.e., sections taken transversely of the longitudinal direction of the glass strip 15) on a level with the abutment member 27 and one of further abutment means for the end edge surface, respectively, the abutment means being described in more detail below.

As is apparent from FIGS. 1-3, the guide rail 13 has four abutment means 31, 32, 33, 34 for the end edge surface 35 of the glass strip 15. These abutment means are positioned on the guide rail 13 so as to correspond with four glass strip positions involving a successive division into halves of a glass strip. Thus, FIG. 1 shows the first position and FIG. 2 shows the fourth and last position during a division of a glass strip into sixteen smaller glass plates equal in size. Each abutment means 31-34 is arranged so as to normally be situated within the guide rail itself, i.e., it does not project beyond the longitudinal edge of the guide rail (see FIG. 6), and consists of a substantially reversed, U-shaped leaf spring whose one end is attached to the back of the guide rail 13. The opposite, free and outwardly bent end of the spring is situated in a corresponding guide track 37 on the cooperation side of the guide rail 13. The guide track 37 extends perpendicular to the longitudinal direction of the guide rail and has a width exactly corresponding to the width of the leaf spring. When a chosen spring 34 (see FIG. 5) is manually activated, as indicated by the arrow 39, the spring is guided by the guide tracks 37 to pass beyond the cooperation surface 29 of the guide rail, so as to form a well-defined abutment for the end edge surface 35 of the glass strip. After the desired position has thus been established, the spring 34 can be released to automatically return to its position of rest out of contact with the glass strip 15.

Figure 4:
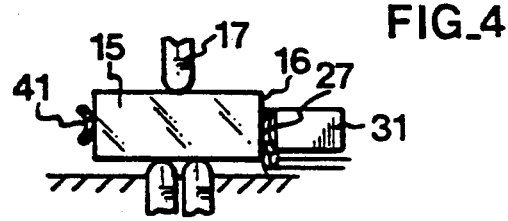

An elongate leaf spring 41 is attached to the guide plate 11 in order to maintain a glass strip 15 in correct position, and substantially extends along the glass strip and cooperates with the free longitudinal edge surface thereof, such that the glass strip is pressed against the guide rail 13. As shown in FIG. 4, the contact surface of the spring 41 is also convex, for the same reasons which apply to the cooperation surface of the guide rail 13. Usually, the effect which the contact pressure of the spring 41 has on the accuracy of the breaking step is negligible. It is, however, possible to completely eliminate the action of the spring 41 before the breaking step (see FIG. 7).

When dividing a glass strip 15 by breaking according to the preferred embodiment of the invention, the glass strip is placed on the supporting pins 9, 10 with one longitudinal edge surface resting against the cooperation surfaces of the guide rail 13, and with the spring 41 in contact with the second longitudinal edge surface. The abutment spring (34 in FIG. 1) is chosen according to the length of the glass strip 15. The abutment spring is pressed to extend out of the guide rail 13 by means of a finger, and the glass strip 15 is displaced longitudinally until its end edge surface 35 engages the spring 34, the contact with the cooperation surfaces of the guide rail being simultaneously maintained. With the glass strip 15 thus positioned, the head 5 is lowered by means of the lever 19, such that the supporting pins 17, 18 of the head are resting on the upper surface of the glass strip. The weight of the head 5 and the spring 41 serve to maintain the positioning when the spring 34 is released and disengages itself from the end edge surface 35. At this stage, the lever 19 is further activated, such that the head 5 is placed and locked in its clamping position to fixedly hold the glass strip 15 between the lower supporting pins 9, 10 and the upper supporting pins 17, 18. At this point, the strip is otherwise completely free except along the line of contact between the longitudinal end edge surfaces of the strip and the guide rail 13 and the spring 41, respectively. As a rule, this line of contact has been found to produce no forces unfavorable either to the final clamping of the glass strip or to the subsequent breaking thereof.

Then, the glass strip "freely" clamped in this manner is scratched in conventional fashion by means of the scratching unit 21, whereupon breaking is carried out in equally conventional manner.

If one nevertheless wishes to eliminate the positioning of the end edge surface of the glass strip before the final clamping, scratching and breaking, this may be carried out in a simple manner according to the principle schematically illustrated in FIG. 7. Here, the guide plate 11 is arranged on the top plate 1 so that it, after performing positioning, may temporarily be pivoted sideways away from the glass strip, a pin 45 being optionally arranged in the top plate to cooperate with the spring 41, such that the latter is pivoted simultaneously in the opposite direction and disengaged from the glass strip. The necessary pivot shaft for the guide plate may be arranged at the right end of the guide rail 13, as indicated in FIG. 7. Naturally, it is possible to have a purely translational motion sideways instead of a pivoting movement, the main criterion being that the starting position of the guide plate 11, in which the positioning of the glass strip is carried out, is exactly defined and that, after the breaking of the glass strip, the guide plate is always returned exactly to the starting position. It will be obvious to anyone skilled in the art how this type of modification could be carried out in actual practice.

The division of a glass strip according to the previously mentioned second embodiment of the invention may be carried out by means of the apparatus described above and schematically illustrated in FIG. 3. As before, the glass strip 15 is placed on the supporting pins 9, 10 and positioned by means of the guide rail 13, 27 and the first abutment means 31 on the guide rail, in a manner corresponding to that described above. As indicated in FIG. 3, that part of the glass strip which initially is long and unguided extends freely to the left. After breaking off a square piece of glass, the remaining part of the glass strip 15 is moved to the right in FIG. 3 to be positioned and divided again as above, and so forth Before the last division, the glass strip has the length apparent from FIG. 7. It will be appreciated that the supplementary member 27 of the guide rail 13 should be situated only so far from the dividing line that it can still cooperate with the glass strip when this is at its shortest, i.e., when it has a length equalling the length of two broken glass plates put together. Naturally, this applies also to the last division of a glass strip, according to the previously described preferred embodiment of the invention.

Figure 8:
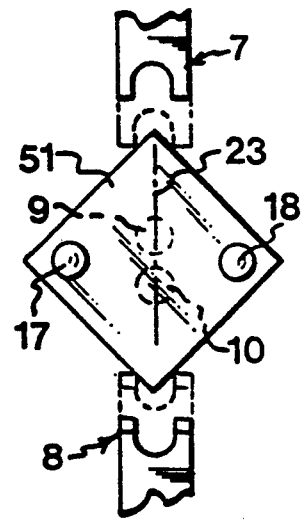
FIG. 8 is a schematic partial top plan view illustrating how the cooperation can easily be eliminated in connection with end product breaking of a square glass plate in a further modified apparatus of the type illustrated in FIGS. 1–7.

FIG. 8 illustrates schematically an example of how the present invention can be applied to end product breaking of a square glass plate 51 in which a modified apparatus according to FIG. 1 is used. The glass plate 51 is positioned in conventional fashion by means of the corner positioning means 7, 8 which, however, are modified such that they can both be moved temporarily away from one another from a well-defined starting position. In this starting position, the means 7, 8 can be set in a conventional manner for positioning the glass plate 51. Then, the glass plate is clamped by means of the supporting pins 9, 10, 17, 18 as described above, whereupon the means 7, 8 are both moved, out of the starting position in a predetermined manner, to thereby eliminate the engagement with the glass plate. In FIG. 8, the engagement position for the positioning means 7, 8 is indicated by dashed lines, and the retracted position for performing the step breaking with no unfavorable forces acting upon the glass plate, is indicated by solid lines. After the glass plate has been broken, the positioning means 7, 8 are returned to their well-defined starting position for exact and direct positioning of a new glass plate, there being no need for again adjusting the positioning means, provided that the new glass plate has exactly the same dimensions as the previous one. The modification of the apparatus necessary for producing the guided and well-defined return movement of the positioning means can easily be made by anyone skilled in the art and therefore need not be described.

I claim:

1. A method of producing a glass knife from a plate of flat glass intended to be divided along a desired dividing line to be scratched thereon, the method comprising the steps of:

using guide means for positioning the plate of flat glass in a predetermined position relative to a first supporting means for providing two points of contact with a first surface of the plate and a second supporting means for providing two points of contact with a second surface of the plate opposite the first surface;

relatively closing the first and second supporting means to contact the plate and support the plate therebetween, with the two points of contact of the first supporting means symmetrically positioned about the desired dividing line, and the two points of contact of the second supporting means symmetrically positioned along the desired dividing line with respect to the two points of contact of the first supporting means;

at least partially disengaging the guide means from contact with the plate;

further relatively closing the first and second supporting means such that the two points of contact of the first supporting means provide a first force line, and the two points of contact of the second supporting means provide a second force line substantially normal to the first force line to break the plate along the desired scratch line.

2. The method of claim 1, wherein the step of at least partially disengaging the guide means comprises fully disengaging the guide means such that the plate is only supported by the first and second supporting means.

3. The method of claim 1 or 2, wherein the step of relatively closing is performed until the plate is securely supported by the first and second supporting means.

4. The method of claim 1, wherein the glass plate is one of square and rhombic and wherein the guide means comprises a pair of positioning means in an initial position for guiding the plate, by making contact with opposite edge surfaces thereof, into the predetermined position, and the step of at least partially disengaging comprises retracting each positioning means, and after the step of further relatively closing, the method further comprises the step of returning the pair of positioning means to their initial position, and repeating the step of using the guide means to position a new plate.

5. The method of claim 1, wherein the glass plate is a strip to be cut into square plates beginning at one end of the strip, then ultimately cutting the squares into triangles, and the guide means includes a plurality of abutment means for contacting the one end of the strip when the strip is in the predetermined position and a pair of positioning means for contacting longitudinal edge surfaces of the strip, wherein the step of using the guide means comprises contacting the longitudinal edge surfaces of the glass strip at two points, each on one side of the desired dividing line, and engaging the one end surface of the glass strip with a selected one of the abutment means.

6. The method of claim 5, wherein the step of engaging is performed manually, the abutment means being resiliently biased into a nonengaging position, such that the step of at least partially disengaging includes a step of allowing the abutment means to return to its nonengaging position.

7. The method of claim 1, wherein the plate is a strip which is divided in the middle to form shorter strips intended to be further divided into square shapes and ultimately into triangular glass knives, and the guide means comprises an abutment means movable to a first position for contacting one end of the strip and to a second position for disengaging from the one end of the strip, wherein the step of using the guide means comprises a step of moving the abutment means to the first position, and the step of at least partially disengaging comprises a step of moving the abutment means to the second position, and wherein the guide means further comprises a pair of positioning means, and the step of using the guide means further comprises a step of contacting the longitudinal edge surface of the strip at at least one point on each side of the strip using the pair of positioning means.

8. The method of claim 7, wherein there are plural abutment means, each resiliently biased to their second position, and the step of using comprises a step of selectively and manually moving one of the abutment means to its first position selected on a length of the strip, and the step of moving the abutment means to the second position comprises a step of allowing the selected abutment means to return to its second position.

9. The method of claim 5, 6, 7, or 8, wherein each of the pair of positioning means comprises a rounded edge, and the step of contacting the longitudinal edge surfaces of the strip comprises contacting the longitudinal edge surfaces with the rounded edge of each positioning means to reduce adhesion and minimize forces acting on the longitudinal edge surfaces.

10. The method of claim 5, 6, 7, or 8, wherein the step of at least partially disengaging comprises disengaging contact between each positioning means and the longitudinal edge surfaces.

11. The method of claim 10, wherein the step of disengaging contact is performed by moving each positioning means from a predetermined initial position to a nonengagement position, and the method further comprises a step of moving each positioning means to the predetermined initial position after the step of further relatively closing.

* * * * *